United States Patent [19]

Parker et al.

[11] Patent Number: 4,881,362

[45] Date of Patent: * Nov. 21, 1989

[54] MOBILE VACUUM SYSTEM FOR USE WITH A RIDING TRACTOR MOWER

[75] Inventors: Richard W. Parker; James P. Beery; Donald L. Boblitt; Robert L. Starr, all of Springfield, Ohio

[73] Assignee: Parker Sweeper Company, Springfield, Ohio

[*] Notice: The portion of the term of this patent subsequent to Aug. 9, 2005 has been disclaimed.

[21] Appl. No.: 229,651

[22] Filed: Aug. 8, 1988

Related U.S. Application Data

[63] Continuation of Ser. No. 698,700, Feb. 6, 1985, Pat. No. 4,761,943.

[51] Int. Cl.$^4$ ............................................. A01D 34/12
[52] U.S. Cl. ........................................ 56/202; 56/16.6; 56/320.2
[58] Field of Search ..................... 56/202, 16.6, 320.2

[56] References Cited

U.S. PATENT DOCUMENTS

| | | | |
|---|---|---|---|
| 4,095,398 | 6/1978 | Aumann et al. | 56/202 |
| 4,142,351 | 3/1979 | Neice et al. | 56/202 |
| 4,761,943 | 8/1988 | Parker et al. | 56/202 |

Primary Examiner—Gene Mancene
Assistant Examiner—Cary E. Stone
Attorney, Agent, or Firm—Jacox & Meckstroth

[57] ABSTRACT

A vacuum-blower unit has an intake connected by a flexible hose to a method plastics boot pivotally connected to the discharge portion of a rotary mower deck mounted on a riding tractor. The boot is also supported in horizontally spaced relation to the deck by a caster wheel to form an air gap and is adapted for convenient connection with decks of different sizes and configurations and having either a right or left discharge. The boot is cut to form an opening somewhat larger than the discharge outlet of the mower deck to extend the air gap which cooperates with air intake holes in the boot to avoid clogging of the boot with grass clippings, leaves and other debris transported by the vacuum-blower unit through flexible ducts to a trailing wheel supported cart. The cart includes a body enclosed by a canopy having an elongated top air discharge outlet covered by a screen and a row of independently pivotal louvers. The cart encloses a set of abutting containers which receive the debris and may be lined with disposable bags, and the containers are individually removable from the cart after the rear door of the cart is opened.

22 Claims, 2 Drawing Sheets

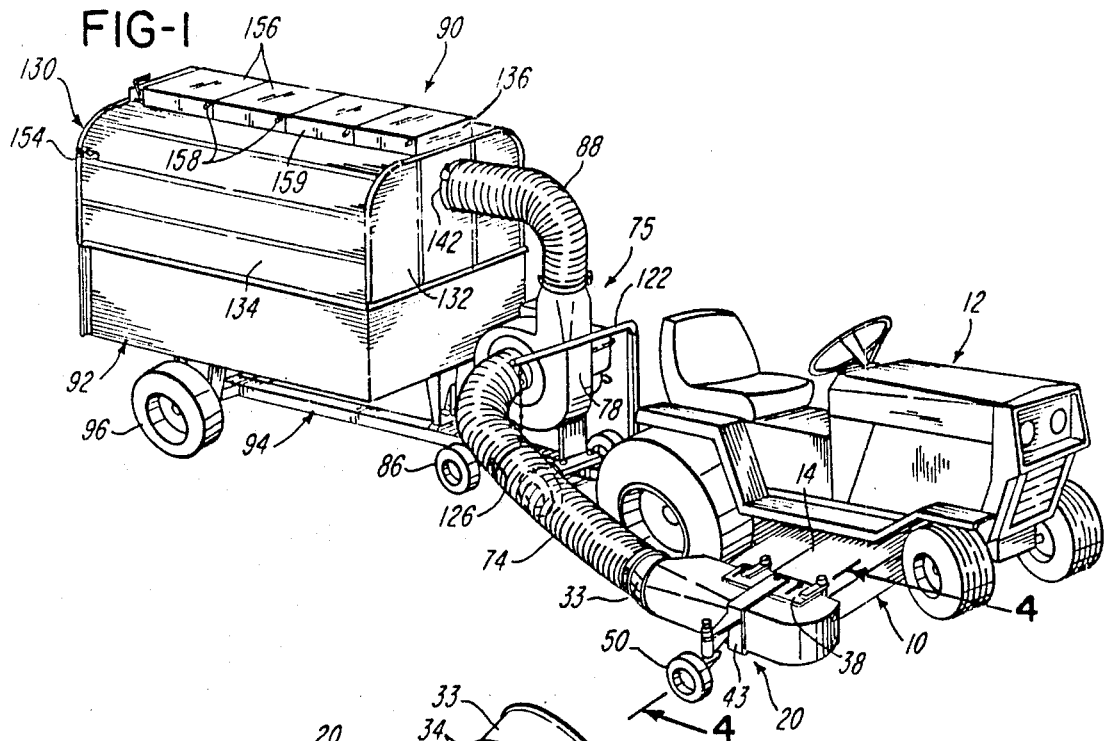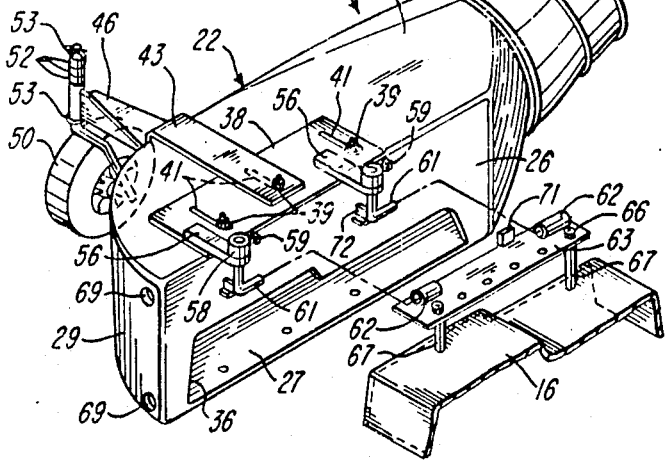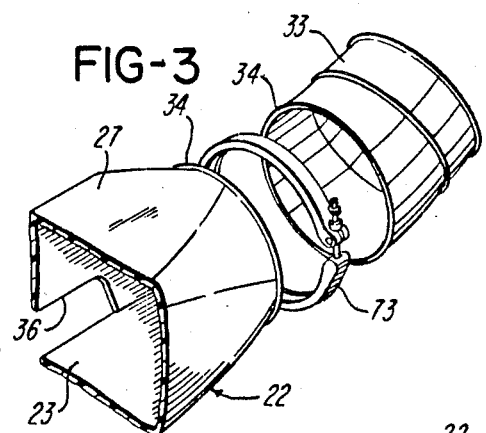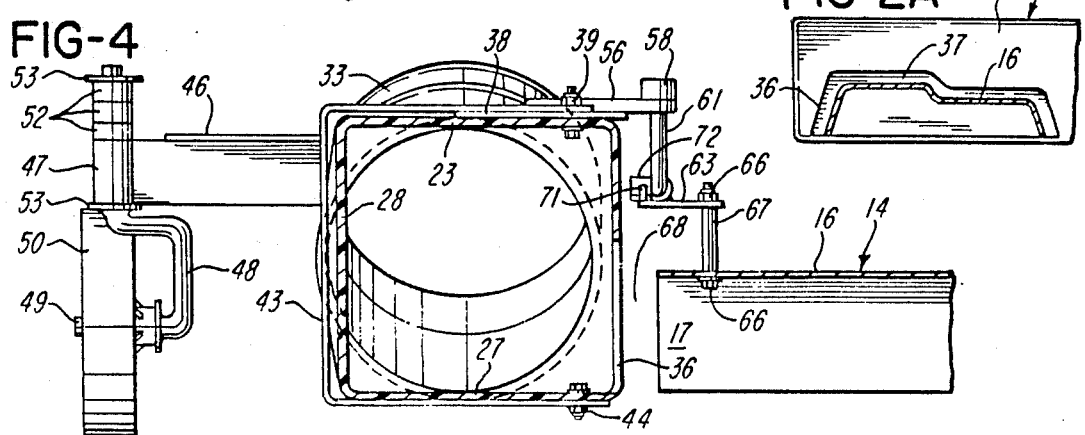

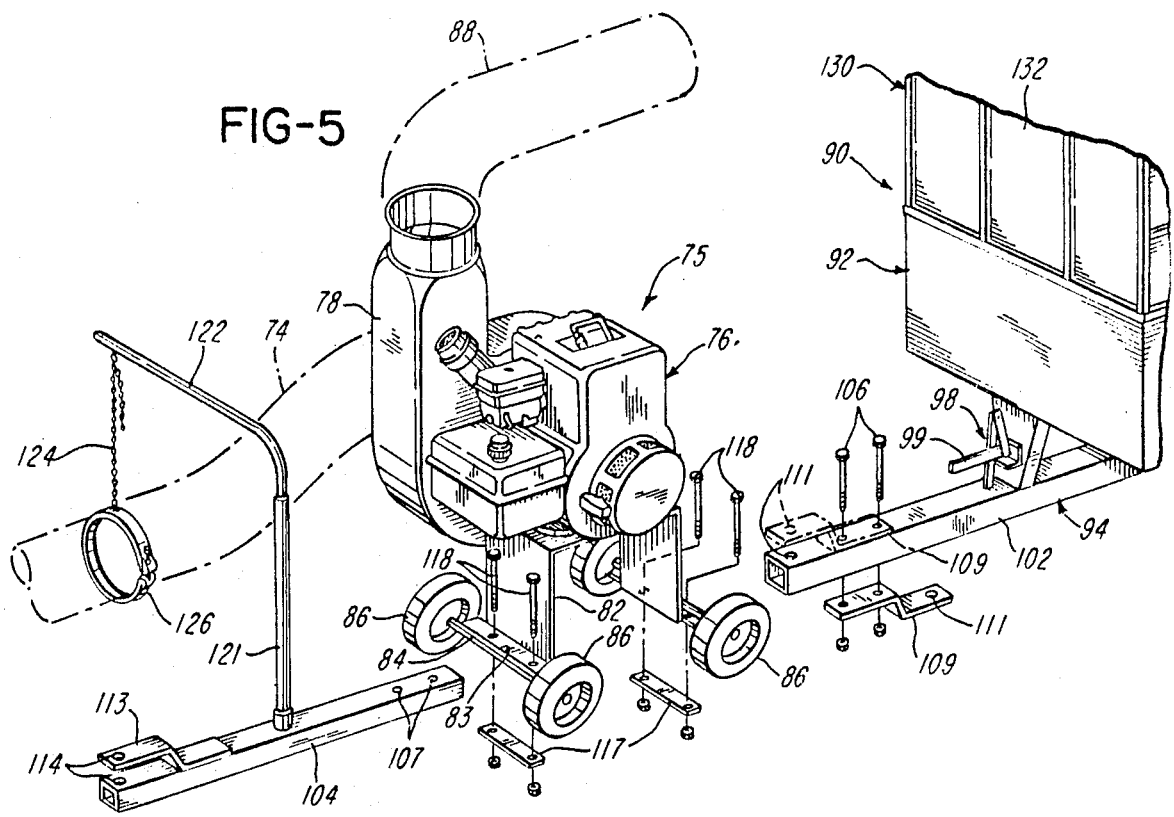
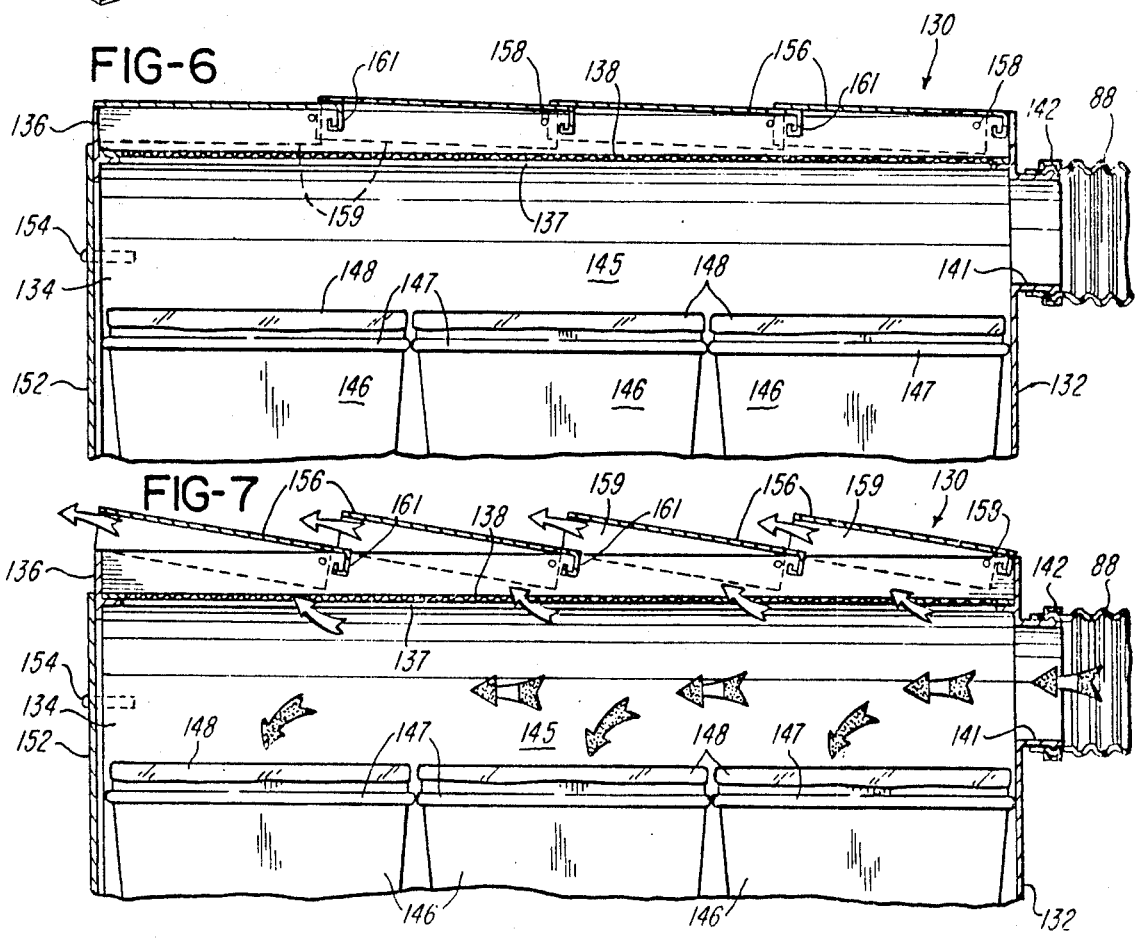

MOBILE VACUUM SYSTEM FOR USE WITH A RIDING TRACTOR MOWER

This is a continuation of application Ser. No. 698,700, filed Feb. 6, 1985, now U.S. Pat. No. 4,761,943.

BACKGROUND OF THE INVENTION

In the art of trailing mobile vacuum systems adapted for collecting the cut grass, leaves and other debris discharged from a rotary mower mounted on a riding tractor, commonly an adaptor boot is constructed for attaching to the discharge portion of the mower deck. The boot is connected by a flexible hose to the inlet of a vacuum-blower unit which has an outlet connected by another flexible hose to a trailing wheel supported cart. The cart usually has a rectangular bed or body which is enclosed by a cover having an air discharge opening covered by a screen. The cart also has a pair of wheel and a tow bar which supports the vacuum-blower unit and includes a hitch for coupling the cart to the riding tractor. The cut grass, leaves and other debris discharged from the outlet of the mower deck are drawn through the boot to the blower and are blown into the covered cart.

As a result of the many different manufacturers of rotary mowers for mounting on riding tractors, the mower decks and discharge outlets have many different sizes and configurations. As a result, the boots have been custom manufactured in many different configurations in order to have a specific boot for a specific mower deck. In addition, some of the rotary mower decks discharge to the right of the riding tractor and other decks discharge to the left of the tractor, thus also requiring the manufacturing and distributing of boots for right and left discharge decks. It has also been common practice to mount or attach each boot directly on the discharge portion of the mower deck with the boot closely surrounding the deck and with the boot inlet conforming to the outlet of the mower deck so that the boot becomes, in effect, an extension of the deck and is carried by the deck.

The manufacturers and distributors of trailing vacuum systems for riding tractor mowers have found it necessary to produce and carry a large inventory of many different boots each having a different configuration corresponding to a deck configuration of a particular rotary mower. This inventory of the many different boots significantly increases the cost of producing and distributing trailing vacuum systems and requires matching different boots to different rotary mowers. It has also been found that many of the boots which attach to the decks of riding lawn mowers present a clogging problem within the boot, especially when the cut grass, leaves or other debris are wet. When the boot clogs, it is necessary for the operator of the tractor to stop the tractor, dismount and manually remove the boot and/or debris from the boot.

As mentioned above, the cut grass, leaves and other debris drawn through the boot by the vacuum-blower unit, are blown into the cart where the debris collects until the cart is full. It is difficult for the operator of the riding tractor to determine when the trailing cart is filled with debris. If you fail to detect when the cart is full, the debris may fill up and clog the flexible hoses connected to the blower and/or fill up and clog the boot and the blower housing. To avoid this problem and the substantial time required for removing the debris clogging the hose, boot and housing, the tractor operator must frequently stop the tractor and vacuum-blower unit, and walk back to the trailing cart to inspect the amount of debris collected within the cart.

It is common for the trailing cart to have a dump-type bed or body to facilitate removing the debris collected and compacted within the cart. Usually, the cart is emptied by towing the cart to a location where the debris may be collected in a pile. The rear door of the cart is removed, and the body is tilted so that the debris may be pulled from the cart usually with the aid of a rake. The removal of the debris from the cart normally requires a significant amount of time, especially if the debris is wet and compacted within the cart.

SUMMARY OF THE INVENTION

The present invention is directed to an improved mobile vacuum system which is ideally suited for use in collecting cut grass, leaves and other debris discharged from a rotary mower mounted on a riding tractor and which solves all of the problems mentioned above. In general, the vacuum system of the invention incorporates, according to a preferred embodiment, a boot molded of a plastics material and positioned in horizontally spaced relation to the outlet of the mower deck by a universally adjustable pivot connection system. The system is adapted to mount on mower decks having either a right discharge portion or a left discharge portion of different configurations. The pivotally connected boot is supported by an outboard caster wheel, and the boot has a flat vertical wall in which the boot inlet is cut after the boot is connected to the mower deck.

The vacuum system of the invention also includes a vacuum-blower unit which has a set of four wheels for independent movement, but which is normally carried by the tow bar and a tow bar extension of a trailing cart having a dump body covered by a canopy. The canopy has an elongated top discharge opening which is covered by a screen, and the opening is normally closed by a row of independent pivotally supported louvers which tilt upwardly in response to air pressure within the cart to provide for a rearward discharge of air from the top of the canopy. The louvers provide an indicator to the tractor operator when the cart is approaching a full condition so that the operator is not required to stop and check the car periodically.

The trailing cart constructed in accordance with the invention encloses a set of open top containers which receive and collect the cut grass, leaves and other debris blown into the cart, ad the containers are individually removable from the cart after the rear doors of the cart are opened. The containers may be lined with corresponding plastic film bags if it is desired to have the debris deposited in disposable trash bags.

Other features and advantages of the invention will be apparent from the following description, the accompanying drawings and the appended claims.

BRIEF DESCRIPTION OF THE DRAWINGS

FIG. 1 is a perspective view of a mobile vacuum system constructed in accordance with the invention and shown connected to a rotary mower mounted on a riding tractor;

FIG. 2 is a perspective view of the boot assembly shown in FIG. 1 and showing a portion exploded from its pivotal connection to the outlet portion of the mower deck;

FIG. 2A is a vertical section of the deck and showing the air gap between the deck discharge outlet and the enlarged opening within the boot;

FIG. 3 is a fragmentary perspective and exploded view of the boot body shown in FIG. 2 and illustrating the boot modified for connection to a mower deck having a left discharge;

FIG. 4 is an enlarged section of the boot assembly and the discharge portion of the mower deck, as taken generally on the line 4—4 of FIG. 1;

FIG. 5 is an exploded perspective view of the vacuum-blower unit shown in FIG. 1 and its mounting on the tow bar and extension of the cart also shown in FIG. 1;

FIG. 6 is a vertical section of the upper portion of the cart shown in FIG. 1 and showing the condition of the cart when the vacuum-blower unit is not operating; and FIG. 7 is a section similar to FIG. 6 and illustrating the flow of air and debris when the vacuum-blower unit is operating.

DESCRIPTION OF THE PREFERRED EMBODIMENT

FIG. 1 illustrates a mobile vacuum system constructed in accordance with the invention and connected for use with a rotary mower 10 supported and carried by a riding lawn tractor 12. The rotary mower 10 includes a formed sheet metal deck 14 having a discharge end portion 16 (FIGS. 1 and 2) defining an outlet 17 (FIG. 4).

A boot assembly 20 includes a body 22 of molded plastics material. The body 22 has a top wall 23, a flat vertical side wall 26, a flat bottom wall 27 and an outer wall 28 which continues to form a curved forward end wall 29 extending to the side wall 26. The body 22 also includes an integrally molded tubular neck or outlet portion 33 which is inclined upwardly from the top wall 23 and defines an outlet for the body 22. A pair of closely spaced circumferential ribs 34 are molded as an integral part of the neck portion 33 and define therebetween a narrow circumferential groove disposed within a vertical plane.

The hollow body 22 of the boot assembly 20 is molded with the side wall 26 being solid. After the side wall 26 is positioned adjacent the outer end of the discharge portion 16 of the deck 14 and the shape of the outlet 17 is scribed or marked on the wall 26, the wall 26 is cut with a saber saw to form an opening or inlet 36. The inlet 36 is somewhat larger than the discharge outlet 17 of the deck 14, as shown in FIG. 2A, to form an air gap 37 therebetween. Preferably, the air gap 37 is one half inch or more.

A boot mounting plate 38 is secured to the top wall 23 of the body 22 by a set of bolts 39 which extend through corresponding slots 41 within the plate 38. The center bolt 39 secures the upper leg of the U-shaped bracket 43 to the body 22, and a bolt 44 (FIG. 4) secures the lower leg of the bracket 43 to the bottom wall 27 of the body 22. An arm 46 is welded to the bracket 43 and projects outwardly to support a cylindrical bearing 47 which rotatably supports a formed shaft or spindle 48. The spindle 48 also forms an axle 49 for a caster wheel 50. The upper end portion of the rod 48 receives a set of collars 52 having different thicknesses, and a pair of retaining washers 53 retain the collars 52 on the rod 48 adjacent the bearing 47. Vertical adjustment of the arm 46 ad the body 22 of the boot assembly 20 relative to the caster wheel 50 may be obtained by locating one or more of the collars 52 on the spindle 48 below the bearing 47 during assembly.

A pair of arms 56 (FIG. 2) are welded to the mounting plate 38 and project outwardly from the vertical wall 26 to support a corresponding pair of collars 58 each receiving a set screw 59. A corresponding pair of L-shaped pivot pins 61 are adjustably retained within the collars 58 and have lower portions which extend into corresponding pivot tubes or bearings 62 welded to a pivot support plate 63. The plate 63 is secured to the discharge portion 16 o the deck 14 by a set of bolts 66 which extend through corresponding spacer tubes 67. The tubes 67 are cut to length along with the bolts 66 after the body 22 of the boot assembly 20 is vertically located relative to the discharge portion 16 of the deck 14, as shown in FIG. 4.

After the boot assembly 20 is mounted on the deck portion 16, as shown in FIG. 4, the bolts 39 are released and the body 22 of the boot assembly 20 is adjusted horizontally to form a horizontal air gap 68 between the wall 26 of the body 22 and the outer end of the mower deck discharge portion 16. Preferably, this air gap 68 is between one half inch and two inches, and a gap of one inch has produced highly desirable results. The gap 68 cooperates with the air gap 37 to allow a significant flow of air to be drawn through the gap into the inlet 36 and thereby provide an auxiliary air flow to the flow of air and debris discharged from the outlet 17 of the mower deck into the inlet 36 of the body 22 of the boot assembly 20. Thus the gaps 37 and 68 provide for an effective curtain flow of air around the discharge portion 16 of the deck 14 and into the body 22 to prevent clogging of debris within the body 22. The front wall 29 of the body 22 is provided with a pair of holes 69 which also provide for an auxiliary flow of air into the body 22.

As also shown in FIG. 2, a stud 71 is welded to the plate 63 and is normally positioned in front of a block 72 welded to the lower portion of the rearward pivot pin 61. The block 71 prevents the pivot pins 61 from disengaging the corresponding pivot tubes 62 when the body 22 of the boot assembly 20 is in the operating position, as shown in FIG. 4. When it is desired to disengage the boot assembly 20 for removal from the deck portion 16, the boot assembly is pivoted upwardly until the block 72 clears the stud 71 after which the boot assembly 20 may be shifted forwardly to remove the pivot pins 61 from the pivot tubes 62. The pivot plate 63 remains attached to the discharge portion 16 of the mower deck.

Referring to FIG. 3, when it is desired to use the boot assembly 20 on a mower deck which discharges to the left of the riding tractor 12 instead of to the right of the riding tractor as shown in FIG. 1, the body 22 of the boot assembly 20 is cut with a saw between the spaced vertical ribs 34. The tubular outlet portion 33 of the body 22, which forms a slight angular elbow, is rotated 180° relative to the remaining portion of the body 22. The outlet portion 33 is then recoupled to the body 22 of a band clamp 73. Thus when the body 22 of the boot assembly 20 is rotated 180° for use with a left discharge mower deck, the top wall 23 and the bottom wall 27 of the body 22 are reversed as shown in FIG. 3, but the tubular neck portion 33 is inclined upwardly relative to the remaining portion of the body 22. It is also apparent in FIG. 3 that the inlet 36 is cut within the wall 26 adjacent the wall 23 instead of the wall 27. Thus the boot assembly 20 may be conveniently modified or adapted to be used with a left discharge rotary mower deck.

The outlet or neck portion 33 of the boot assembly 20 is connected by a flexible reinforced duct or hose 74 (FIG. 1) to the inlet of a vacuum-blower assembly or unit 75. As shown in FIG. 5, the unit 75 includes a gasoline powered engine 76 which directly drives an impeller or fan (not shown) enclosed within a centrifugal blower housing 78 molded of a rigid plastics material in the same manner as the body 22 of the boot assembly 20. A similar form of engine-blower unit is disclosed in U.S. Pat. No. 4,118,826 which issued to the assignee of the present invention.

As shown in FIG. 5, the vacuum-blower unit 75 is mounted on an inverted U-shaped support plate 82 having bottom flanges 83 each welded to an axle 84 supporting a pair of wheels 86. When the unit 75 is not in use, as when a utility cart only is required, the wheels 86 permit the unit to be transported to a storage area or to another area for servicing of the unit 75.

A flexible reinforced duct or hose 88 connects the outlet of the blower housing 78 to the upper portion of a mobile cart 90. The cart 90 includes a rectangular sheet metal bed or body 92 which is pivotally supported by axles (not shown) projecting from a generally T-shaped frame 94 and supporting a pair of wheels 96. The body 92 is normally retained in a horizontal position (FIG. 1) by a releasable latch mechanism 98 (FIG. 5). When the latch mechanism 98 is released by lifting a latch arm 99, the body 92 may be tilted to dump the contents within the body.

The frame 94 of the cart 90 includes a rectangular tow bar 102 (FIG. 5) which supports the latch mechanism 98 and telescopically receives a tow bar extension 104. A pair of bolts 106 extend through holes within the bar 102 and aligned holes 107 within the tow bar extension 104 and secure the tow bar extension 104 to the tow bar 102. The bolts 106 also retain a Z-shaped hitch plate 109 which may be located in a stored position on the underneath surface of the two bar 102 or may be secured in a hitch position as illustrated by the phantom lines in FIG. 5. In the hitch position, the plate 109 and the tow bar 102 have aligned holes 111 for receiving a hitch pin when it is desired to connect or couple the cart 90 directly to the riding tractor 12.

The tow bar extension 104 also carries a Z-shaped hitch plate 113 (FIG. 5) and has aligned holes 114 for coupling the tow bar extension to the tractor 12. When the two bar 102 and the tow bar extension 104 are connected together by the bolts 106, the vacuum-blower unit 75 is mounted on and supported by the tow bar and extension assembly, as illustrated in FIG. 5. The flanges 83 of the plate 83 are rigidly secured to the tow bar and extension assembly by a pair of clamping plates or straps 117 and a set of bolts 118. The tow bar extension 104 also carries a vertical tube 121 which rotatably supports an L-shaped hose support arm 122. An adjustable chain 124 connects the outer end of the arm 122 to a collar 126 which receives the hose 74 so that the arm 122 supports the hose 74 above the ground and away from the tractor wheel.

Referring to FIGS. 1 and 6, the body 92 of the trailer or cart 90 is enclosed by a canopy 130 which is formed of sheet metal panels and includes a front wall 132 and opposite side walls 134 having upper portions which curve inwardly to a rectangular frame 136 (FIGS. 1, 6 and 7) defining an elongated air outlet 137 at the top of the cart 90. The outlet 137 is covered by a mesh screen 138, and the front wall 132 of the canopy 130 has an outwardly projecting cylindrical collar 141 which receives the rearward end portion of the flexible hose 88 and a surrounding band clamp 142.

The body 92 and the canopy 130 of the cart 90 define a chamber 145 which is filled by a set of six separate open top containers 146. The rigid containers 146 have upper peripherally extending reinforcing ribs 147 which contact each other within a horizontal plane slightly below the inlet defined by the collar 141. Each of the open top containers 146 may be lined with a disposable bag 148 formed from an extruded plastics film material.

The rear of the cart 90 is closed by a removable tail gate (not shown) which conforms to the shape of the body 92 and a rear door 152 which conforms to the shape of the canopy 130. The bottom of the door 152 is retained by a set of tabs (not shown) which project downwardly behind the tail gate, and the upper portion of the door 152 is retained by a set of releasable over center latches 154. When the latches 154 are released, the door 152 may be lifted to disengage the bottom of the door, thus permitting complete removal of the door for opening the chamber 145.

Referring to FIGS. 1, 6 and 7, the elongated discharge opening or outlet 137 defined by the rectangular frame 136 and covered by the screen 138, is normally closed by a set of louvers 156 each of which is pivotally supported by a pair of bolts 158 connecting downwardly projecting side flanges 159 of the louver to the frame 136. Each of the louvers 156 also has a forward flange 161 adjacent the pivot bolts 158 and is free to pivot upwardly, as shown in FIG. 7, to a maximum angle of about thirty degrees in response to the pressure of the air flowing into the chamber 145 through the house 88.

In operation of the mobile suction or vacuum system constructed in accordance with the invention as described above, the discharge of cut grass, leaves and other debris from the rotary mower 10 is directed into the inlet 36 of the boot assembly 20. The suction of the vacuum-blower unit 75 draws the debris from the boot assembly 20 into the blower housing 78 and then blows the debris through the hose 88 into the chamber 145 of the trailer or cart 90. Part of the air drawn into the boot assembly 20 flows into the inlet 36 through the gaps 37 and 68 as a curtain of air. A smaller flow of air also flows into the boot assembly 20 through the intake holes 69 within the forward wall 29 of the body 22. This auxiliary flow of air through the gaps 37 and 68 and the holes 69 assures that the debris continues to flow through the body 22 of the boot assembly and thereby prevents clogging of the body 22, especially when the cut grass, leaves and other debris are damp or wet.

As the debris is blown into the upper portion of the cart chamber 145 through the hose 88, the debris falls into the containers 146 while the air flows through the screen 138, lifts the louvers 156 upwardly and is discharged rearwardly of the cart, as shown in FIG. 7. The flanges 161 prevent fluttering of the louvers 156 as the air is discharged rearwardly from the louvers. The containers 146 at the rear of the cart 90 fill before the containers in the middle of the cart, and the containers in the middle of the cart fill before the containers in the front of the cart. Thus the containers and the space above the containers progressively fill from the rear of the cart towards the front of the cart.

As the containers 146 and the space above the containers progressively fill from the rear of the cart to the front of the cart, the corresponding louvers above the containers progressively pivot downwardly towards the closed position. This provides an accurate indicator to the operator of the riding tractor when the cart chamber 145 is becoming filled. When the forward most louver 156 begins to pivot downwardly or close, the operator knows that the cart chamber 145 is substantially full and needs to be emptied. After the cart 90 is transported to the area where it is to be emptied, the tail gate and rear door 152 are removed, and the containers 146 are individually removed after the debris in the space above the container is pressed or packed downwardly into the container. After each container is removed, the disposable liner bag 148 is tied at the top and then lifted from the container for disposing of the debris within the bag. Of course, the containers 146 may be used within liner bags.

From the drawings and the above description, it is apparent that a mobile vacuum system constructed in accordance with the invention, provides desirable features and advantages. For example, not only will the boot assembly 20 accommodate rotary mower decks of many different sizes and configurations by simply cutting the bolts 66 and tubes 67 to proper lengths, the boot assembly 20 will also accommodate rotary mowers having either a right or left discharge with respect to the tractor 12. The adjustable mounting and support of the boot assembly 20 also prevents clogging of the boot assembly with the debris discharged from the rotary mower, and further, permits convenient and quick disengagement of the boot assembly from the mower deck. The collection of the cut grass, leaves and other debris within the containers 146 substantially simplifies removing the debris from the cart chamber 145 for convenient disposal. In addition, the series of pivotal louvers 156 provide for not only discharging the air rearwardly of the cart 90 and away from the tractor operator, but also provide the operator with a progressive indicator as the cart chamber 145 fills up with debris so that the operator may easily avoid clogging of the debris within the hoses 74 and 88 and the blower housing 78.

While the form of mobile vacuum system herein described constitutes a preferred embodiment of the invention, it is to be understood that the invention is not limited to this precise form, and that changes may be made therein without departing from the scope and spirit of the invention as defined in the appended claims.

The invention having thus been described, the following is claimed:

1. A mobile vacuum system in combination with a rotary mower including a deck having a discharge portion defining an outlet for discharging cut grass, leaves and other debris, said system comprising a power driven vacuum-blower unit having an inlet and an outlet, a hollow boot having a generally vertical first wall portion defining an inlet and a second wall portion defining an outlet, a flexible hose connecting said outlet of said boot to said inlet of said vacuum-blower unit, connecting means mounted on said deck and positioning said first wall portion in horizontally spaced relation to said discharge portion of said deck with said inlet of said boot opposing said outlet of said deck, said connecting means including a pivot connection providing for pivoting said boot on a generally horizontal axis relative to said deck, and said first wall portion defining said inlet of said boot cooperating with said discharge portion of said deck to define a substantial air suction gap between said discharge portion of said deck and said first wall portion substantially around said discharge portion of said deck to provide for an envelope flow of air into said boot around said discharge portion of said deck to assure a continuous flow of debris from said mower to said vacuum-blower unit.

2. A mobile vacuum system as defined in claim 1 wherein said pivot connection provides for quickly disconnecting said boot from said discharge portion of said deck.

3. A mobile vacuum system as defined in claim 1 wherein said connecting means include a set of boot support members adapted to be cut to predetermined lengths for engaging the discharge portion of the mower deck and for accommodating deck portions having different configuration.

4. A mobile vacuum system in combination with a rotary mower including a deck having a discharge portion defining an outlet for discharging cut grass, leaves and other debris, said system comprising a power driven vacuum-blower unit having an inlet and an outlet, a hollow boot having a first wall portion defining an inlet and a second wall portion defining an outlet, a flexible hose connecting said outlet of said boot to said inlet of said vacuum-blower unit, means forming a container connected to said outlet of said vacuum-blower unit, connecting means mounted on said deck and positioning said boot in predetermined spaced relation to said discharge portion of said deck with said inlet of said boot opposing said outlet of said deck, said first wall portion defining said inlet of said boot being spaced from said discharge portion of said deck to define a substantial air suction gap between said discharge portion of said deck and said first wall portion of said boot, and said gap extending substantially around said discharge portion of said deck to provide for an envelope flow of air into said boot around said discharge portion of said deck to assure a continuous flow of debris from said mower to said vacuum-blower unit.

5. A mobile vacuum system as defined in claim 4 wherein said inlet for said boot is somewhat larger relative to the corresponding dimensions of said outlet of said deck to define said air suction gap.

6. A mobile vacuum system as defined in claim 4 and including a wheel supported cart having a body supporting a canopy covering said body, said body and said canopy defining said container for receiving the debris, a duct connecting said outlet of said vacuum-blower unit to said container, means including a screen defining a top discharge opening for said canopy, at least one louver disposed above said discharge opening, and means supporting said louver for tilting movement on a generally horizontal pivot axis between a closed position covering said discharge opening and an inclined open position for directing discharge air from said container.

7. A mobile vacuum system as defined in claim 6 wherein said discharge opening is elongated, and a plurality of said louvers arranged longitudinally in a row for covering said discharge opening.

8. A mobile vacuum system as defined in claim 4 and including a wheel supported cart having a generally rectangular body and a generally rectangular cover for said body to define said container, a duct connecting said outlet of said vacuum-blower unit to said container, substantially rigid open top receptacle means supported within said cart for removal, said receptacle means substantially filling said cart for collecting within said receptacle means substantially all of the debris blown into said cart by said vacuum-blower unit, and said cart having releasable door means providing for convenient removal of said receptacle means.

9. A mobile vacuum system as defined in claim 8 wherein said receptacle means comprise a plurality of removable receptacles substantially filling said cart.

10. A mobile vacuum system as defined in claim 8 wherein said cover defines a discharge opening covered by a screen member, a louver covering said discharge opening, and pivot means supporting said louver for pivotal movement on a generally horizontal pivot axis between a closed position covering said discharge opening and an inclined open position for directing discharged air from the said chamber.

11. A mobile vacuum system as defined in claim 10 wherein said cart has a tow bar projecting forwardly for connection to the riding tractor, and said louver slopes upwardly and rearwardly in said open position for exhausting air from said chamber rearwardly of said cart and away from the operator of the riding tractor.

12. A mobile vacuum system as defined in claim 4 and including a wheel supported cart having a generally rectangular body and a generally rectangular cover for said body, said body and said cover defining said container for receiving debris, a duct connecting said outlet of said vacuum-blower unit to said container, means defining a discharge opening for said cover, said cart having a tow bar projecting forwardly for pivotal connection to the tractor, support means removably mounted on said tow bar for supporting said vacuum-blower unit, and said support means including a set of elevated wheels normally spaced above the ground during use of the vacuum system but providing for independently supporting and transporting said vacuum blower unit after said support means is removed from said tow bar.

13. A mobile vacuum system in combination with a rotary mower including a deck having a discharge portion defining an outlet for discharging cut grass, leaves and other debris, said system comprising a power driven vacuum-blower unit having an inlet and an outlet, a boot having a first wall portion defining an inlet and a second wall portion defining an outlet, a flexible hose connecting said outlet of said boot to said inlet of said vacuum-blower unit, connecting means mounted on said deck and positioning said boot in predetermined relation to said discharge portion of said deck with said inlet of said boot opposing said outlet of said deck, said second wall portion of said boot including a tubular outlet portion defining said outlet, and means for rotating said tubular outlet portion relative to said first wall portion defining said inlet to provide for using said boot with a mower deck having either a right discharge portion or a left discharge portion.

14. A mobile vacuum system as defined in claim 13 wherein said boot comprises a molded plastics material and said tubular outlet portion is integral with said boot and is adapted to be cut from said boot.

15. A mobile vacuum system in combination with a rotary mower including a deck having a discharge portion defining an outlet for discharging cut grass, leaves and other debris, said system comprising a power driven vacuum-blower unit having an inlet and an outlet, a boot having a first wall portion defining an inlet and a second wall portion defining an outlet, a flexible hose connecting said outlet of said boot to said inlet of said vacuum-blower unit, connecting means mounted on said deck and positioning said boot in predetermined relation to said discharge portion of said deck with said inlet of said boot opposing said outlet of said deck, said first wall portion defining said inlet of said boot cooperating with said discharge portion of said deck to define a substantial air suction gap between said discharge portion of said deck and said first wall portion to provide for a substantial flow of air into said boot around said discharge portion of said deck to assure a continuous flow of debris from said mower to said vacuum-blower unit, and said boot having a third wall portion defining at lease one air intake hole to provide for an additional flow of air into said boot and to help avoid clogging of said boot.

16. A mobile vacuum system in combination with a rotary mower including a deck having a discharge portion defining an outlet for discharging cut grass, leaves and other debris, said system comprising a power driven vacuum-blower unit having an inlet and an outlet, a boot having means defining an inlet and an outlet, a flexible hose connecting said outlet of said boot to said inlet of said vacuum-blower unit, support means adapted to be mounted on said deck and supporting said boot adjacent said discharge portion of said deck with said inlet of said boot opposing said outlet of said deck, a wheel supported cart having a generally rectangular body and a generally rectangular cover for said body to define a chamber, a duct connecting said outlet of said vacuum-blower unit to said chamber, removable container means supported by said cart within said chamber, said container means having an open top disposed generally in a horizontal plane below the position of said duct, said container means substantially filling said chamber in said plane for collecting substantially all of the debris blown into said chamber by said vacuum-blower unit, and said cart having releasable door means providing for convenient removal of said container means.

17. A mobile vacuum system in combination with a rotary mower including a deck having a discharge portion defining an outlet for discharging cut grass, leaves and other debris, said system comprising a power driven vacuum-blower unit having an inlet and an outlet, a boot having means defining an inlet and an outlet, a flexible hose connecting said outlet of said boot to said inlet of said vacuum-blower unit, support means for mounting on said deck and supporting said boot adjacent said discharge portion of said deck with said inlet of said boot opposing said outlet of said deck, a wheel supported cart having a body and cover for said body, said body and cover defining a chamber for receiving the debris, a duct connecting said outlet of said vacuum-blower unit to said chamber, means including a screen defining a discharge opening for said canopy, said cart having a tow bar projecting forwardly for pivotal connection to the tractor, bracket means removably mounted on said tow bar, said vacuum-blower unit being mounted on said bracket means, a set of elevated wheels mounted on said bracket means and normally spaced above the ground during use of the vacuum system, and said wheels providing for independently supporting and transporting said vacuum-blower unit after said bracket means are removed from said tow bar and said wheels are lowered to the ground.

18. A mobile vacuum system as defined in claim 17 wherein said bracket means comprise an inverted U-shaped bracket, and said set of wheels comprise four wheels mounted on said bracket.

19. A mobile vacuum system in combination with a rotary mower including a deck having a discharge portion defining an outlet for discharging cut grass, leaves and other debris, said system comprising a power driven vacuum-blower unit having an inlet and an outlet, a boot having means defining an inlet and an outlet, a flexible hose connecting said outlet of said boot to said inlet of said vacuum-blower unit, support means for mounting on said deck and supporting said boot adjacent said discharge portion of said deck with said inlet of said boot opposing said outlet of said deck, a wheel supported cart having a body and a cover for said body, said body and cover defining a chamber for receiving the debris, a duct connecting said outlet of said vacuum-blower unit to said chamber, means including a screen defining a top discharge opening for said cover, at least one louver disposed above said discharge opening, and means supporting said louver for tilting movement on a generally horizontal pivot axis in response to the flow of air within said chamber and between a closed position covering said discharge opening and an inclined open position for directing discharge air from said chamber to provide a visual indication when said chamber is becoming filled with debris.

20. A mobile vacuum system as defined in claim 19 wherein said discharge opening is elongated, and a plurality of said louvers arranged longitudinally in a row for covering said discharge opening.

21. A mobile vacuum system as defined in claim 19 and including removable open top container means supported by said cart within said chamber, said container means substantially filling said chamber in a horizontal plane below the position of said duct to provide for collecting within said container means substantially all of the debris blown into said chamber by said vacuum-blower unit, and said cart having releasable door means providing for convenient removal of said container means.

22. A mobile vacuum system as defined in claim 19 wherein said cart has a tow bar projecting fowardly for connection to the riding tractor, and said louver slopes upwardly and rearwardly in said open position for exhausting air from said chamber rearwardly of said cart and away from the operator of the riding tractor.

* * * * *